United States Patent
Yamada et al.

(10) Patent No.: US 9,979,504 B2
(45) Date of Patent: May 22, 2018

(54) TERMINAL DEVICE, AND RECEPTION METHOD

(71) Applicant: Sharp Kabushiki Kaisha, Osaka-shi, Osaka (JP)

(72) Inventors: Ryota Yamada, Osaka (JP); Kozue Yokomakura, Osaka (JP); Katsuya Kato, Osaka (JP); Hiromichi Tomeba, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 93 days.

(21) Appl. No.: 14/901,973

(22) PCT Filed: Jun. 19, 2014

(86) PCT No.: PCT/JP2014/066338
§ 371 (c)(1),
(2) Date: Dec. 29, 2015

(87) PCT Pub. No.: WO2015/001982
PCT Pub. Date: Jan. 8, 2015

(65) Prior Publication Data
US 2016/0373204 A1    Dec. 22, 2016

(30) Foreign Application Priority Data
Jul. 3, 2013  (JP) .................................. 2013-139355

(51) Int. Cl.
*H04J 11/00* (2006.01)
*H04W 16/32* (2009.01)
(Continued)

(52) U.S. Cl.
CPC ............. *H04J 11/005* (2013.01); *H04J 11/00* (2013.01); *H04J 11/0026* (2013.01);
(Continued)

(58) Field of Classification Search
CPC ... H04J 11/0056; H04J 11/0026; H04W 88/02
(Continued)

(56) References Cited

U.S. PATENT DOCUMENTS

2006/0268983 A1* 11/2006 Kwon ................... H04B 7/12
375/240.11
2013/0163462 A1*  6/2013 Ohwatari ............ H04B 7/0865
370/252
(Continued)

OTHER PUBLICATIONS

3GPP, "3rd Generation Partnership Project; Technical Specification Group Radio Access Network; Network-Assisted Interference Cancellation and Suppression for LTE (Release 12)", 3GPP TR 36.866 V1.0.0 (Nov. 2013), pp. 1-59.
(Continued)

*Primary Examiner* — Gary Mui
(74) *Attorney, Agent, or Firm* — Birch, Stewart, Kolasch & Birch, LLP

(57) ABSTRACT

A terminal device is intended to reduce a decrease in reception performance in response to inter-cell interference and inter-user interference even when multiple interference streams are received. The terminal device connected with a first base station apparatus receives a first interference signal serving as inter-user interference from the first base station apparatus, and a second interference signal serving as inter-cell interference from a second base station apparatus, demodulates at least one interference stream of the first interference signal using terminal information transmitted from the first base station, and suppresses the second interference signal using a reception weight.

2 Claims, 5 Drawing Sheets

(51) Int. Cl.
*H04W 92/20* (2009.01)
*H04W 88/02* (2009.01)

(52) U.S. Cl.
CPC ....... *H04J 11/0036* (2013.01); *H04J 11/0056* (2013.01); *H04W 16/32* (2013.01); *H04W 92/20* (2013.01); *H04W 88/02* (2013.01)

(58) Field of Classification Search
USPC .................................................. 370/310–350
See application file for complete search history.

(56) References Cited

U.S. PATENT DOCUMENTS

| 2014/0126404 A1* | 5/2014 | Kim .......................... H04L 1/00 370/252 |
| 2015/0055612 A1* | 2/2015 | Tanaka .................. H04L 5/0035 370/329 |

OTHER PUBLICATIONS

MediaTek, Renesas Mobile Europe, Broadcom Corporation, "Study on Network-Assisted Interference Cancellation and Suppression for LTE", 3GPP TSG RAN Meeting #59, RP-130404, Vienna, Austria, Feb. 26-Mar. 1, 2013, pp. 1-7.

* cited by examiner

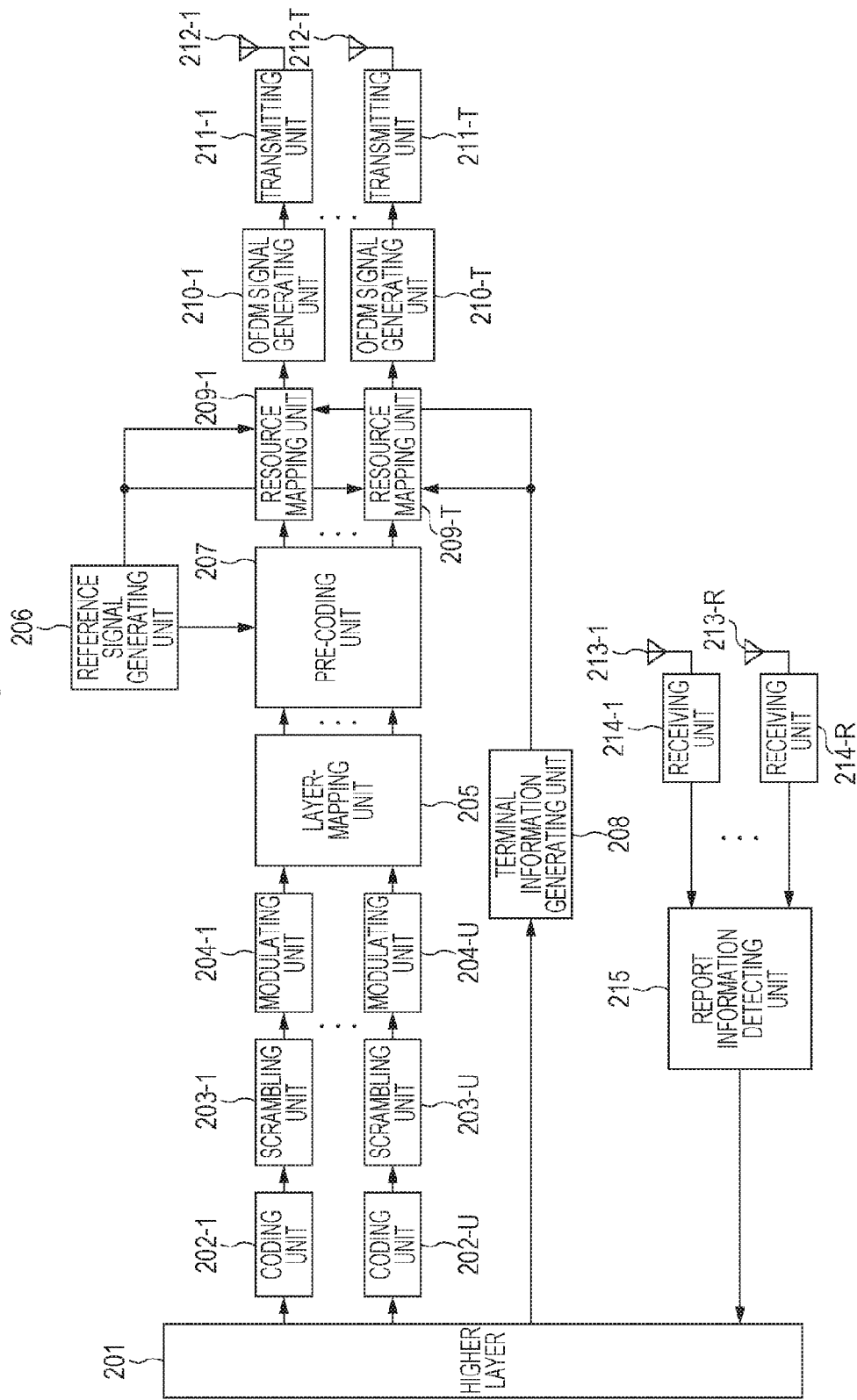

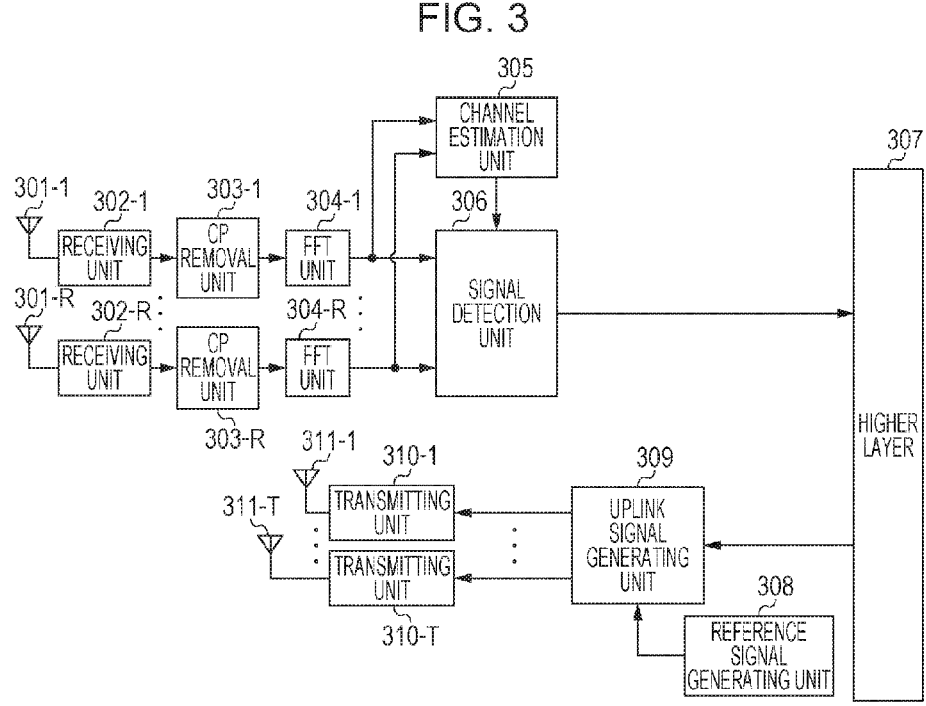
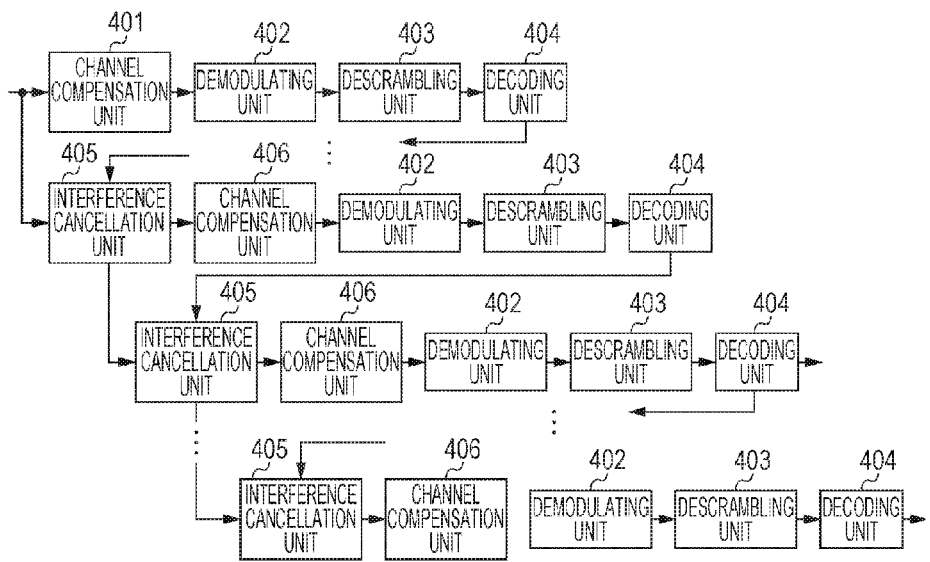

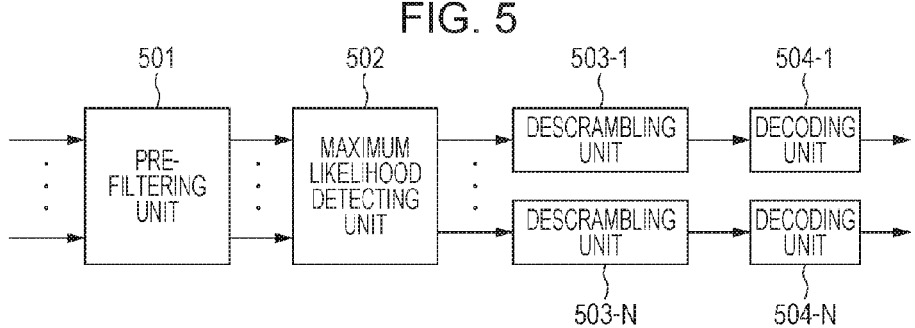
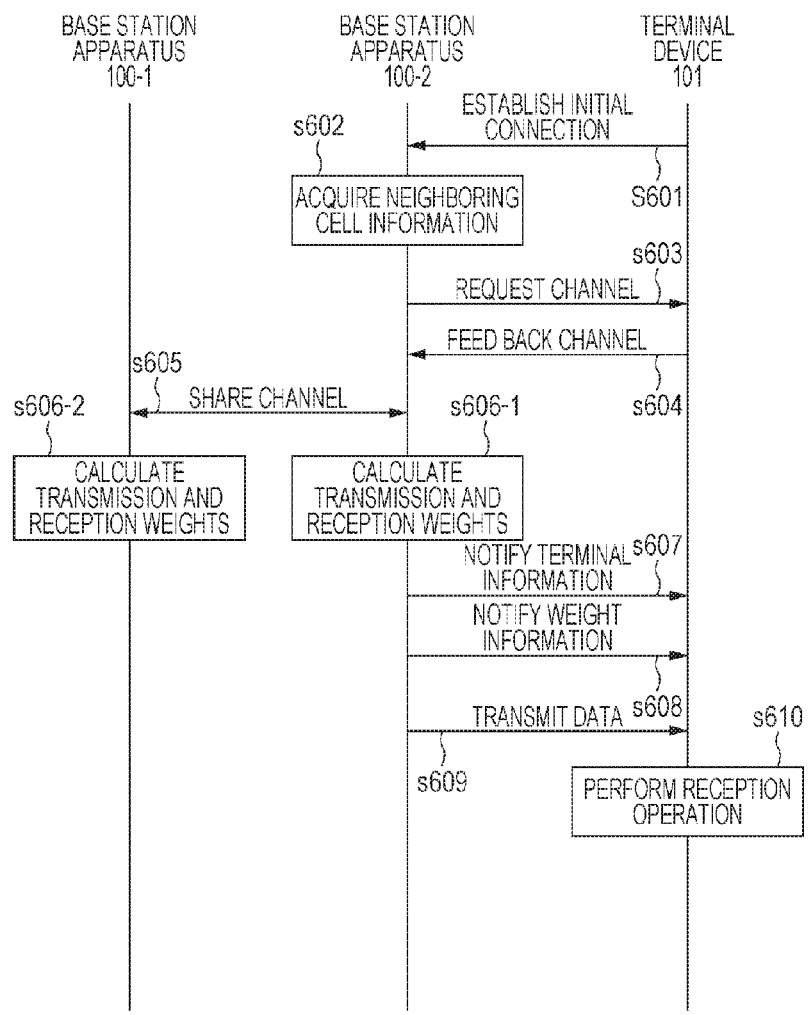

TERMINAL DEVICE, AND RECEPTION METHOD

TECHNICAL FIELD

The present invention relates to a terminal device, and a reception method.

BACKGROUND ART

As smart phones and tablet terminals are widely used, traffic in mobile communication is increasing exponentially and is expected to increase even further from now on. A dense deployment of base stations in a heterogeneous network is under study as a countermeasure step to the increase in radio traffic. In the dense deployment of base stations, low power base stations (LPNs: Low Power Nodes) are deployed in a macrocell, and each terminal device is connected to a low power base station. The workload on a macro base station is thus reduced. In this case, however, inter-cell interference becomes problematic.

MU-MIMO (Multi-User Multiple Input Multiple Output) intended to use multiple terminal devices in spatial multiplexing is under study to achieve an increased throughput. In MU-MIMO, interference between terminal devices (inter-user interference) becomes problematic.

Concerning the inter-cell interference or inter-interference, NAICS (Network Assisted Interference Cancellation and Suppression) with a terminal device configured to suppress or cancel an interference signal is under study in 3GPP (3rd Generation Partnership Project). In NAICS, the terminal device receives information related to another terminal device serving as an interfering source, detects a signal addressed to the interfering terminal device, and then cancels the interference. NAICS is described in Non Patent Literature 1.

CITATION LIST

Non Patent Literature

NPL 1: RP-130404, "Study on Network-Assisted Interference Cancellation and Suppression for LTE," 3GPP TSG RAN Meeting #59, March 2013

SUMMARY OF INVENTION

Technical Problem

However, the number of receive antennas of a terminal device needs to be higher than the number of interference stream signals in NAICS to detect an interference signal at a high accuracy level for the detection and cancellation of the interference signal. If interference streams higher in number than the receive antennas are received or if a small terminal device typically not large enough to mount a sufficient number of receive antennas is used, interference cancellation may not be performed at a high accuracy level and reception performance may be degraded.

The present invention has been developed in view of the above problem, and the object of the present invention is provide a terminal device and a reception method to reduce degradation in the reception performance caused by the inter-cell interference and inter-user interference even when a large number of interference streams is received.

Solution to Problem

The terminal device, and the reception method of the present invention intended to solve the above problem are constituted as described below.

A terminal device of the present invention communicated with a first base station apparatus receives a first interference signal serving as inter-user interference from the first base station apparatus, and a second interference signal serving as inter-cell interference from a second base station apparatus, demodulates at least one interference stream of the first interference signal using terminal information transmitted from the first base station, and suppresses the second interference signal using a reception weight.

In the terminal device of the present invention, the number of second base stations is plural.

In the terminal device of the present invention, the first interference signal is suppressed subsequent to suppression of the second interference signal.

A base station apparatus of the present invention operates in cooperation with other multiple base station apparatuses, notifies a terminal device connected thereto of terminal information used to demodulate a first interference signal serving as inter-user interference and suppresses inter-cell interference in cooperation with the other base station apparatus.

A reception method of the present invention of a terminal device connected with a first base station apparatus, includes receiving a first interference signal serving as inter-user interference from the first base station apparatus, and a second interference signal serving as inter-cell interference from a second base station apparatus, and demodulating at least one interference stream of the first interference signal using terminal information transmitted from the first base station, and suppressing the second interference signal using a reception weight.

Advantageous Effects of Invention

According to the present invention, the first interference signal and the second interference signal are received, the first interference signal is demodulated using the terminal information notified by the base station apparatus, and the second interference signal is suppressed using the reception weight. Even if a large number of interference streams are received, the degradation in the reception performance caused by the inter-cell interference and the inter-user interference is reduced, and increased throughput thus results.

BRIEF DESCRIPTION OF DRAWINGS

FIG. 2 is a block diagram diagrammatically illustrating a base station apparatus of the first embodiment.

FIG. 3 is a block diagram diagrammatically illustrating a terminal device of the first embodiment.

FIG. 4 is a block diagram diagrammatically illustrating a signal detection unit of the first embodiment.

FIG. 5 is a block diagram diagrammatically illustrating a signal detection unit of a second embodiment.

FIG. 6 is a sequence chart illustrating a communication system of a third embodiment.

DESCRIPTION OF EMBODIMENTS

First Embodiment

A first embodiment of the present invention is described below. A communication system of the present embodiment includes a base station apparatus (transmission apparatus, cell, transmission point, transmit antenna group, transmit antenna port group, component carrier, or eNodeB) and a terminal (terminal device, mobile terminal, reception point, reception terminal, reception apparatus, receive antenna group, receive antenna port group, or UE).

Figure 1:
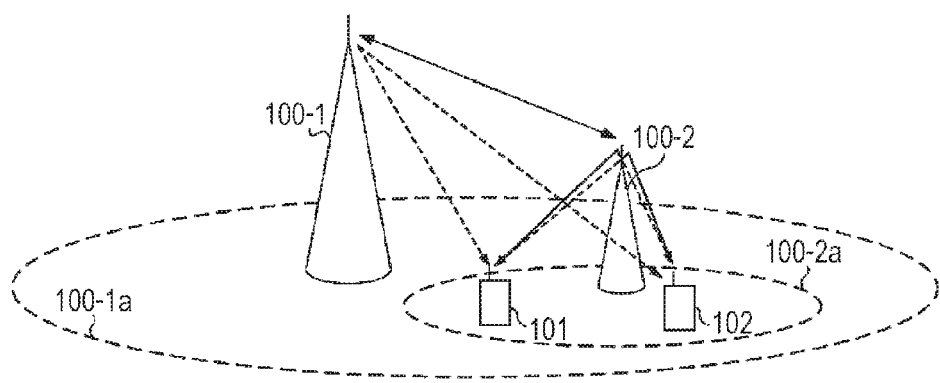
FIG. 1 diagrammatically illustrates a communication system of a first embodiment.

FIG. 1 illustrates an example of a communication system of the first embodiment. The communication system of FIG. 1 includes a base station apparatus (also referred to as a macro base station or a first base station) 100-1, base station apparatuses (also referred to as LPN: Low Power Nodes, low-power base stations, or second base stations) 100-2 lower in transmission power than the macro base station, terminal devices 101, and 102. The macro base station 100-1 has a coverage (macro cell) 100-1a, and the low-power base stations 100-2 has a coverage (a picocell or a small cell) 100-2a. The term coverage refers an area within which the base station apparatus remains connectable with the terminal device (communication area). In the following discussion, the macro base station and the low-power base station form a multi-cell. The present invention is not limited to this configuration. For example, the multi-cell may be formed by a macro base station alone, or low-power base stations alone. Referring to FIG. 1, the macro base station is not connected to the terminal device, but the case in which the macro base station is connected to the terminal device also falls within the present invention. The base station apparatuses may be radio-linked or wire-linked to each other.

In a case that there are multiple low-power base stations, the low-power base stations may be different in transmission power. The macro base station is discriminated from the low-power base station in transmission power. Also, the base stations may be discriminated in terms of whether the base station is a station having backward compatibility that supports a previously introduced service or a newly defined station having no backward compatibility.

The low-power base stations may be different from each other in terms of service system (version or option of the communication system).

The present invention is not limited to the following embodiments in terms of the number of cells, the number of base stations, the number of terminal devices, the type of cells (such as macrocell, picocell, femtocell, or small cell), and the type of base stations. Referring to FIG. 1, the small cell fully overlaps the macrocell, but the small cell may partially overlap the macrocell, or the small cell may not overlap the macrocell at all.

FIG. 2 is a block diagram diagrammatically illustrating a configuration of the base station apparatus 100-2 of the present embodiment. The base station apparatus 100-2 includes a higher layer 201, coding units 202-1 through 202-U, scrambling units 203-1 through 203-U, modulating units 204-1 through 204-U, a layer-mapping unit 205, a reference signal generating unit 206, a pre-coding unit 207, a terminal information generating unit 208, resource mapping units 209-1 through 209-T, OFDM signal generating units 210-1 through 210-T, transmitting units 211-1 through 211-T, transmit antennas 212-1 through 212-T, receive antennas 213-1 through 213-R, receiving units 214-1 through 214-R, and a report information detecting unit 215. As illustrated in FIG. 2, the letter U represents the number of streams spatial multiplexed, and at least one stream is addressed to a different terminal device. The letters T, and R respectively represent the number of transmit antennas, and the number of receive antennas. If part or whole of the base station apparatus 100-2 is integrated into an integrated circuit as a chip, the base station apparatus 100-2 includes a chip control circuit configured to control the functions of the blocks.

The higher layers 201 include a layer having a function higher than a physical layer, from among the layers having communication functions defined by OSI reference model. For example, the higher layers 201 include a MAC (Media Access Control) layer, a data link layer, a network layer, and other layers. The higher layer 201 notifies the base station apparatus 100-2 another parameter that is needed for each element forming the base station apparatus 100-2 to implement the function thereof.

The coding units 202-1 through 202-U error-correction code information data input from the higher layer 201, thereby generating a coded bit (also referred to as codeword). The information data includes a voice signal for phone call, a still image or a moving image representing a captured image, and a text message. The coding scheme the coding units 202-1 through 202-U use in the error-correction coding includes turbo coding, convolutional coding, or low density parity check coding (LDPC).

The coding units 202-1 through 202-U may perform rate matching on the coded bit sequence such that the coding rate of the error-correction coded data sequence matches a coding rate responsive to the data transmission rate. The coding units 202-1 through 202-U may have an interleave function to re-construct a data sequence that has been error-correction coded.

The scrambling units 203-1 through 203-U scramble the codewords input from the coding units 202-1 through 202-U in accordance with each cell ID.

The modulating units 204-1 through 204-U map the scrambled codeword to a modulation symbol. The modulation scheme performed by the modulating units 204-1 through 204-U includes BPSK (Binary Phase Shift Keying), QPSK (Quadrature Phase Shift Keying), or M-QAM (M-Quadrature Amplitude Modulation with M=16, 64, 256, 1024 or 4096). The modulating units 204-1 through 204-S may have an interleave function of re-constructing the generated modulation symbols.

The layer-mapping unit 205 layer-maps the modulation symbol for spatial multiplexing. For example, LTE-A (LTE-Advanced) supports a maximum of eight layers, and a single codeword is mapped to a maximum of four layers.

The reference signal generating unit 206 generates reference signals, and then outputs a reference signal to be pre-coded to the pre-coding unit 207 and a reference signal not be pre-coded to the resource mapping units 209-1 through 209-T.

The pre-coding unit 207 performs a pre-coding operation on the output from the layer-mapping unit 205. Part of the reference signal, such as DMRS (DeModulation Reference Symbol), may undergo the same pre-coding as the data signal that is to be demodulated.

The terminal information generating unit 208 generates information concerning another terminal device for each spatial multiplexed terminal device to detect and cancel an interference signal (the information is also referred to as terminal information). For example, if the terminal device 101 and the terminal device 102 are spatial-multiplexed, the terminal information of the terminal device 102 is notified to the terminal device 101 and the terminal information of the terminal device 101 is notified to the terminal device 102. For example, the terminal information is needed to demodulate or decode a signal addressed to another terminal device, and for example includes a cell ID, modulation scheme, coding rate, reference signal, antenna port number, and resource allocation information. The terminal information may be the control information.

The resource mapping units 209-1 through 209-T map the output of the pre-coding unit 207, the reference signal, and the terminal information to resources.

The OFDM (Orthogonal Frequency Division Multiplexing) signal generating units 210-1 through 210-T perform an IFFT (Inverse Fast Fourier Transform) operation on and insert a cyclic prefix (CP) into the output of the resource mapping units 209-1 through 209-T. The transmitting units 211-1 through 211-T perform a digital-to-analog conversion operation, a filtering operation, a frequency conversion, and other operations on the generated OFDM signal, and the resulting signals are transmitted through the transmit antennas 212-1 through 212-T.

The base station apparatus 100-2 also has a function of receiving signals. The receive antennas 213-1 through 213-R receive signals from the terminal device, and the receiving units 213-1 through 213-R perform a frequency conversion operation, a filtering operation, an analog-to-digital conversion operation, and other operation on the received signals. The report information detecting unit 215 determines information needed to determine a rank number, such as CSI (Channel State Information) fed back from the terminal device, information used to determine MCS (Modulation and Coding Scheme), and channel information of the interference signal. The channel information includes information needed for pre-coding, such as a channel matrix, channel covariance matrix, and information indicating the channel matrix and channel covariance matrix.

FIG. 3 is a block diagram diagrammatically illustrating a configuration of the terminal device of the present embodiment. The terminal device includes receive antennas 301-1 through 301-R, receiving units 302-1 through 302-R, CP removal units 303-1 through 303-R, FFT units 304-1 through 304-R, a channel estimation unit 305, a signal detection unit 306, a higher layer 307, a reference signal generating unit 308, an uplink signal generating unit 309, transmitting units 310-1 through 310-T, and transmit antennas 311-1 through 311-T. If part or whole of the terminal device is integrated into an integrated circuit as a chip, the terminal device may include a chip control circuit (not illustrated) to control each function block. The number of transmit antennas T, and the number of receive antennas R are designated in the same way as in the base station apparatus 100-2. The numbers of antennas may or may not be equal between the terminal device and the base station apparatus.

The receive antennas 301-1 through 301-R receive signals in the terminal device, and the receiving units 302-1 through 302-R perform a frequency conversion operation, a filtering operation, an analog-to-digital conversion operation, and other operation on the received signals. The CP removal units 303-1 through 303-R remove the cyclic prefixes from the outputs from the receiving units 302-1 through 302-R, and the FFT units 304-1 through 304-R perform timefrequency transform. The channel estimation unit 305 determines a channel estimation value using DMRS. If the DMRS is pre-coded, the channel estimation unit 305 determines a channel estimation value accounting for the pre-coding operation. The signal detection unit 306 cancels the interference signal notified through the terminal information by the base station apparatus 100-2, suppresses the other interference signals with linear weight, determines information data addressed thereto, and outputs the information data to the higher layer 307.

The terminal device also has a function of transmitting a signal. The reference signal generating unit 308 generates an uplink reference signal. The uplink signal generating unit 309 generates an uplink signal based on the information data acquired from the higher layer, the parameter for generating the uplink signal, the reference signal acquired from the reference signal generating unit 308, and the information to be reported to the base station apparatus 100-2. Note that the uplink signal includes an SC-FDMA (Single Carrier-Frequency Division Multiple Access) symbol and an OFDMA symbol. The transmitting units 310-1 through 310-T perform a digital-to-analog conversion operation, a filtering operation, a frequency conversion operation, and other operation on the output of the uplink signal generating unit 309, and the resulting signals are transmitted via the transmit antennas 311-1 through 311-T.

FIG. 4 is a block diagram diagrammatically illustrating the signal detection unit 306. The signal detection unit 306 includes channel compensation units 401 and 406, a demodulating unit 402, a descrambling unit 403, a decoding unit 404, and an interference cancellation unit 405. The channel compensation unit 401 performs channel compensation using a reception weight, thereby suppressing inter-cell interference (and noise). The demodulating unit 402 performs a demodulation operation, thereby determining a bit log likelihood ratio (LLR). If a signal addressed to another terminal device is modulated, the demodulating unit 402 performs the demodulation operation using the terminal information. The descrambling unit 403 performs a descrambling operation on the demodulated signal that has been scrambled by the base station apparatus, and determines the bit log likelihood ratio of the codeword. The decoding unit 404 error-correction decodes the bit log likelihood ratio of the codeword. In the case of the signal transmitted to the other terminal device, the decoding unit 404 decodes the bit log likelihood ration using the terminal information, and outputs the resulting coded bit log likelihood ratio to the interference cancellation unit 405. In the case of the signal addressed to the terminal device, the decoding unit 404 determines an information bit through decoding. If the decoding unit 404 has not finished decoding all the streams, the decoded bit log likelihood ratio is output to the interference cancellation unit 405. The channel compensation unit 406 performs channel compensation on the signal with interference canceled therefrom.

The operation of the signal detection unit 306 is described in the case of the configuration of FIG. 1 using formulas. Formula (1) expresses a reception signal r(k,t) in a resource element (k,t) of the terminal device 101. Here, k and t respectively represent a subcarrier index, and an OFDM symbol index.

[Math 1]

$$r(k,t)=H_{11}(k,t)s_1(k,t)+H_{12}(k,t)s_2(k,t)+H_{13}(k,t)s_3(k,t)+n(k,t) \qquad (1)$$

$H_{11}$ represents a channel matrix between the base station apparatus 100-2 and the terminal device 101, $s_1$ represents a signal transmitted from the base station apparatus 100-2 to the terminal device 101, $H_{12}$ represents an interference channel matrix of $s_2$ between the base station apparatus 100-2 and the terminal device 101, $s_2$ represents a signal transmitted from the base station apparatus 100-2 to the terminal device 102, $H_{13}$ represents a channel matrix between the base station apparatus 100-1 and the terminal device 101, and $s_3$ represents a signal transmitted from the base station apparatus 100-1 to the terminal device connected to the base station apparatus 100-1. Here, n represents noise. More specifically, the first term on the right side of formula (1) represents a desired signal, the second term represents inter-user interference (also referred to as a first interference signal), and the third term represents inter-cell interference (also referred to as a second interference signal). Note that a base station apparatus serving as an interference source of the first interference signal is referred to as a first base station, and a base station apparatus serving as an interference source of the second interference signal is referred to a second base station apparatus. The second base station apparatuses may include one or more base station apparatuses.

The channel compensation unit 401 performs channel compensation to suppress $H_{13}$ and n (in other words, the inter-cell interference and noise). For example, a weight expressed by formula (2) may be used herein. Formula (1) may be multiplied by the weight calculated in accordance with formula (2) from left to perform channel compensation.

[Math 2]

$$W(k,t)^H = [\hat{H}_{11}(k,t)\hat{H}_{12}(k,t)]^H R^{-1} \quad (2)$$

Note that $\hat{H}$ represents a channel estimation value, and is the one estimated by the channel estimation unit 305. Superscript H represents a complex conjugate transposed matrix. R represents an auto-correlation matrix of a received signal, and may be determined using a resource element or a data channel (Physical Downlink Shared Channel) to which a reference signal (RS) is allocated.

R may be determined in accordance with formula (3) using the reference signal.

[Math 3]

$$R = \hat{H}_{11}(k,t)\hat{H}_{11}(k,t)^H + \hat{H}_{12}(k,t)\hat{H}_{12}(k,t)^H + Q \quad (3)$$

Note that Q represents a covariance matrix of interference noise. Formula (4) is applicable in a case that Q is to be determined using CRS (Cell-specific RS), and formula (5) is applicable in a case that Q is to be determined using DM-RS.

[Math 4]

$$Q = \frac{1}{N_{CRS}} \sum_{k,t \in CRS} \tilde{r}(k,t)\tilde{r}(k,t)^H \quad (4)$$

$$Q = \frac{1}{N_{DMRS}} \sum_{k,t \in DMRS} \tilde{r}(k,t)\tilde{r}(k,t)^H \quad (5)$$

$$\tilde{r}(k,t) = r(k,t) - \hat{H}_{11}(k,t)s_1(k,t) - \hat{H}_{12}(k,t)s_2(k,t) \quad (6)$$

$N_{CRS}$ represents the number of CRS resource elements used in the calculation of Q, and $N_{DMRS}$ is the number of DMRS resource elements in the calculation of Q.

The following formula (7) provides a method to determine R using a data channel or a DMRS resource element.

[Math 5]

$$R = \frac{1}{N_{PDSCH,DMRS}} \sum_{k,t \in PDSCH,DMRS} r(k,t)r(k,t)^H \quad (7)$$

$N_{PDSCH,DMRS}$ represents the sum of the data channel used in the calculation of R and the number of DMRS resource elements.

All streams may be demodulated and decoded subsequent to the channel compensation, but successive interference canceller (SIC) is applied in the following discussion.

Subsequent to the channel compensation in accordance with formula (2), the inter-user interference is demodulated and decoded, and then the interference cancellation is performed. The interference cancellation may be performed on all interference streams at a time. In the following discussion, however, the interference streams are successively canceled one by one. Although the interference cancellation is performed in order starting with a stream index 1. The present invention is not limited to this method, and any interference cancellation sequence may be used.

The interference cancellation unit 405 performs the interference cancellation in accordance with formula (8) in order to cancel the first interference stream from the base station apparatus 100-2. Formula (8) indicates an operation performed in a given resource element, and (k,t) is omitted unless otherwise needed.

[Math 6]

$$\tilde{r}_{0,1} = r - (\hat{H}_{12})_1(\hat{s}_2)_1 \quad (8)$$

$(\cdot)_1$ represent a first column in matrix, or a first element in vector. $\hat{s}$ represents a vector that contains as an element a symbol replica that is an expected value of modulation symbol. The symbol replica is expressed in formula (9) in the QPSK modulation.

[Math 7]

$$\frac{1}{\sqrt{2}}\tanh(\lambda_1/2) + \frac{j}{\sqrt{2}}\tanh(\lambda_2/2) \quad (9)$$

Note that $\lambda_1$ and $\lambda_2$ respectively represent a first bit log likelihood ratio and a second bit log likelihood forming the QPSK symbol. Also in formula (9), tan h represents a hyperbolic tangent function, and j represents imaginary unit.

The channel compensation unit 406 performs the channel compensation using the following weight.

[Math 8]

$$W_{0,1}^H = (\hat{H}_{12})_2^H R_{0,1}^{-1} \quad (10)$$

$$R_{0,1} = (\hat{H}_{11}\hat{H}_{11}^H + \hat{H}_{12}\Delta_{2,1}\hat{H}_{12}^H + Q)^{-1} \quad (11)$$

$$\Delta_{2,1} = \text{diag}[E[|(s_2)_1|^2] - |(\hat{s}_2)_1|^2, 1, \ldots, 1] \quad (12)$$

Note that E[ ] represents an expected value, and diag[ ] represents a diagonal matrix having diagonal elements within brackets. Q may be determined using the reference signal in a manner similar to formulas (4) and (5). R is determined from the signal with the interference canceled therefrom as represented in formula (13) in a case that data is used.

[Math 9]

$$R_{0,1} = \frac{1}{N_{PDSCH,DMRS}} \sum_{k,t \in PDSCH,DMRS} \tilde{r}_{0,1}(k,t)\tilde{r}_{0,1}(k,t)^H \quad (13)$$

Subsequent to the channel compensation, the second interference stream is decoded. The second interference stream may be removed, if needed. The interference cancellation to x-th interference stream (x>1) may be performed as expressed in formula (14).

[Math 10]

$$\tilde{r}_{0,x} = \tilde{r}_{0,x-1} - (\hat{H}_{12})_x(\hat{s}_2)_x \quad (14)$$

The channel compensation unit 406 performs the channel compensation using a weight expressed by formula (15).

[Math 11]

$$W_{0,x}^H = (\hat{H}_{12})_{x+1}^H R_{0,x}^{-1} \quad (15)$$

$$R_{0,x} = (\hat{H}_{11}\hat{H}_{11}^H + \hat{H}_{12}\Delta_{2,x}\hat{H}_{12}^H + Q)^{-1} \quad (16)$$

$$\Delta_{2,x} = \text{diag}[E[|(s_2)_1|^2] - |(\hat{s}_2)_1|^2, \ldots, E[|(s_2)_x|^2] - |(\hat{s}_2)_x|^2, 1, \ldots, 1] \quad (17)$$

$R_{0,x}$ may be determined using data in accordance with formula (18).

[Math 12]

$$R_{0,x} = \frac{1}{N_{PDSCH,DMRS}} \sum_{k,t \in PDSCH,DMRS} \tilde{r}_{0,x}(k,t)\tilde{r}_{0,x}(k,t)^H \quad (18)$$

All interference streams from the base station apparatus 100-2 are thus canceled. Signals addressed to the terminal device, if spatial multiplexed, suffer from inter-stream interference. Such interference is similarly canceled using SIC. The interference cancellation of the signals addressed to the terminal device until x-th stream (x>0) is performed as expressed in the following formula (19). Note that S represents the number of interference streams from the base station apparatus 100-2.

[Math 13]

$$\tilde{r}_{x,S} + \tilde{r}_{x+1,S} - (\hat{H}_{11})_x(\hat{s}_1)_x \quad (19)$$

The channel compensation unit 406 may use a weight expressed by formula (20).

[Math 14]

$$W_{x,S}^H + (\hat{H}_{11})_{x+1}^H R_{x,S}^{-1} \quad (20)$$

$$R_{x,S} + (\hat{H}_{11}\Delta_{1,x}\hat{H}_{11}^H + \hat{H}_{12}\Delta_{2,S}\hat{H}_{12}^H + Q)^{-1} \quad (21)$$

$$\Delta_{1,x} + \text{diag}[E[|(s_1)_1|^2] - |(\hat{s}_1)_1|^2, \ldots E[|(s_1)_x|^2] - |(\hat{s}_1)_x|^2, 1, \ldots, 1] \quad (22)$$

In a case that data is used, $R_{x,S}$ is determined in accordance with the following formula (23).

[Math 15]

$$R_{x,S} = \frac{1}{N_{PDSCH,DMRS}} \sum_{k,t \in PDSCH,DMRS} \tilde{r}_{x,S}(k,t)\tilde{r}_{x,S}(k,t)^H \quad (23)$$

The above operations are performed until all signals addressed to the terminal device are decoded.

In accordance with the present embodiment, the inter-user interference is detected and canceled while the inter-cell interference is suppressed using the reception weight. Since only interference having a higher signal strength within the same cell is canceled at a higher accuracy level, throughput is increased.

In accordance with the present embodiment, the interference streams is detected and canceled one by one as described above. The present invention is not limited to this method. Alternatively, multiple interference streams may be detected and canceled. In accordance with the present embodiment, the detection and cancellation are performed on the interference stream. The present invention is not limited to this method. Alternatively, the detection and cancellation may be performed on a desired stream. In such a case, the detection and cancellation may be performed on the interference stream after the desired stream is canceled, and then a desired stream may be determined again. A desired stream and an interference stream may be detected and canceled repeatedly. If a desired stream and an interference stream are repeatedly detected and canceled, the terminal device may configure the interference streams to be detected and canceled depending on the number of repetitions. For example, part of a signal of the inter-user interference is detected with a sufficient accuracy through the repetitions down to a previous cycle, there is no need to detect the interference stream again. This method cuts down on computation more than if all the inter-user interference is detected by performing full repetitions.

Second Embodiment

A second embodiment is different from the first embodiment in the signal detection unit 306 alone. Only the signal detection unit 306 is described.

FIG. 5 is a block diagram diagrammatically illustrating the signal detection unit 306 of a second embodiment. The signal detection unit 306 includes a pre-filtering unit 501, a maximum likelihood detecting unit 502, descrambling units 503-1 through 503-N, and decoding units 504-1 through 504-N. N represents the sum of a desired signal and the number of streams of an interference signal demodulated by the terminal device. More specifically, in the present embodiment, N is the sum of the number of streams from the base station apparatus 100-2 and the number of streams from the base station apparatus 100-1.

The pre-filtering unit 501 multiplies a received signal by a weigh that whitens the inter-cell interference and noise. The maximum likelihood detecting unit 502 performs maximum likelihood detection (MLD) on the output from the pre-filtering unit 501, thereby determining a coded bit log likelihood ratio of a desired signal. The coded bit log likelihood ratios are descrambled by the descrambling units 503-1 through 503-N, and then error-correction decoded by the decoding units 504-1 through 504-N.

The operation of the signal detection unit 306 in the present embodiment is described in accordance with formulas. The pre-filtering unit 501 multiples the received signal r by a weight that whitens the interference noise as expressed by formula (24). The whitening weight is determined as $Q^{-1/2}$ from the covariance matrix Q of the interference noise. $Q^{-1/2}$ is determined through Cholesky decomposition or eigenvalue decomposition of the covariance matrix Q.

[Math 16]

$$Q^{-1/2}r = Q^{-1/2}H_{11}s_1 + Q^{-1/2}H_{12}s_2 + Q^{-1/2}H_{13}s_3 + Q^{-1/2}n \quad (24)$$

Formula (24) may be re-written into formula (25) where the received signal subsequent to the whitening weight multiplication, the channel matrix, and noise are respectively represented by r', $H_{11}$', $H_{12}$', $H_{13}$', and n'.

[Math 17]

$$r' + H'_{11}s_1 + H'_{12}s_2 + H'_{13}s_3 + n' \quad (25)$$

If MMSE weight is determined in accordance with formula (25), formula (25) becomes identical to formula (2). Since the whitening weight is multiplied, the covariance matrix of the interference noise is not determined, and a unit matrix may be used. The maximum likelihood detecting unit 502 detects the maximum likelihood on r' in accordance with formula (26).

[Math 18]

$$\lambda_{q,n} = \\ -\min_{b^+} \left\| r' - (\hat{H}'_{11}s_{1,b} + \hat{H}'_{12}s_{2,c}) \right\|^2 + \min_{b^-} \left\| r' - (\hat{H}'_{11}s_{1,b} + \hat{H}'_{12}s_{2,c}) \right\|^2 \quad (26)$$

$\lambda_{q,n}$ represents an n-th bit log likelihood ratio of the modulation symbol of a q-th stream in the desired signal. $s_{1,b}$ represents a transmission signal candidate of $s_1$ defined by a bit train $b = [b_{1,1}, \ldots, b_{N1,M1}]$. N1 is the number of streams of the desired signal, and M1 represents the number of constellations of the modulation signal of the desired signal. M1=4 in QPSK, M1=16 in 16QAM, and M1=64 in 64QAM. $s_{2,c}$ is a transmission signal candidate of $s_2$ defined by a bit train $c = [c_{1,1}, \ldots, c_{N2,M2}]$. N2 is the sum of the number of streams of the interference signals to be demodulated by the terminal device, and M2 is the number of constellations of the modulation signal of the interference signal. $b^+$ represents a set having $b_{q,n} = 1$. $b^+ = [b_{1,1}, \ldots, b_{q,n} = 1, \ldots, b_{N1,M1}]$. $b^-$ represents a set having $b_{q,n} = 0$ of b. $b^- = [b_{1,1}, \ldots, b_{q,n} = 0, \ldots, b_{N1,M1}]$. $\lambda_{q,n}$ is determined as a difference between a minimum metric generated using $b^+$ and a minimum metric generated using $b^-$.

The maximum likelihood detecting unit 502 does not necessarily have to calculate all the transmission signal candidates, and may determine the bit log likelihood ratio from part of the transmission signal candidates. A method, such as sphere decoding, M algorithm, or QRM (QR decomposition and M algorithm)-MLD, may be used to reduce the transmission signal candidates.

In accordance with the second embodiment, the maximum likelihood detection is performed subsequent to the multiplication of a pre-filter configured to whiten the inter-cell interference and noise received by the terminal device. The maximum likelihood detection is performed on the interference streams within the same cell while the inter-cell interference is suppressed.

Third Embodiment

FIG. 6 is a sequence chart of a process performed between the base station apparatus and the terminal device of a third embodiment. For example, the terminal device 101 is connected to the base station apparatus 100-2 as illustrated in FIG. 1. The terminal device 101 detects a cell (cell ID) available for communication in cell searching using a synchronization signal, and establishes an initial connection with the base station apparatus 100-2 (step s601). The base station apparatus 100-2 recognizes a neighboring cell (step s602). The base station apparatus 100-2 requests the terminal device 101 to measure a channel of the neighboring cell (step s603). The terminal device 101 measures the channel of the neighboring cell indicated by the base station apparatus 100-2, and then feeds back the CSI to the base station apparatus 100-2 (step s604). The terminal device 101 also feeds back the channel between the base station apparatus 100-2 and the terminal device 101. the base station apparatuses 100-1 and 100-2 share a channel matrix between each of the base station apparatuses and the terminal device 101 such that each base station apparatus generates transmission and reception weights (step s605). To share information among the base station apparatuses, X2 interface may be used or another method may be used. The base station apparatuses 100-1 and 100-2 calculate the transmission and reception weights to suppress the interference signal from the base station apparatus 100-1 to the terminal device 101 (steps s606-1 and s606-2). The base station apparatus 100-2 notifies the terminal device 101 of terminal information serving as interference to the terminal device 101 (step s607). The base station apparatus 100-2 notifies the terminal device 101 of the transmission weight of each base station apparatus or the reception weight of the terminal device 101, whichever is needed (step s608). The notification of the weight may be changed depending on the version of standards or transmission mode. For example, if CRS is used for demodulation, the transmission weight is notified. If the RS and data have been multiplied by the same pre-coding weight (such as in the case of DMRS), no weight is notified. The notification of the reception weight may be changed depending on whether request the terminal device to determine the reception weight. The base station apparatus 100-2 transmits the pre-coded data to the terminal device 101 (step s609). The terminal device 101 suppresses the interference signal from the base station apparatus 100-1 by multiplying the interference signal by the reception weight, and detects and cancels the interference signal from the base station apparatus 100-2 (step s610).

Figure 7:
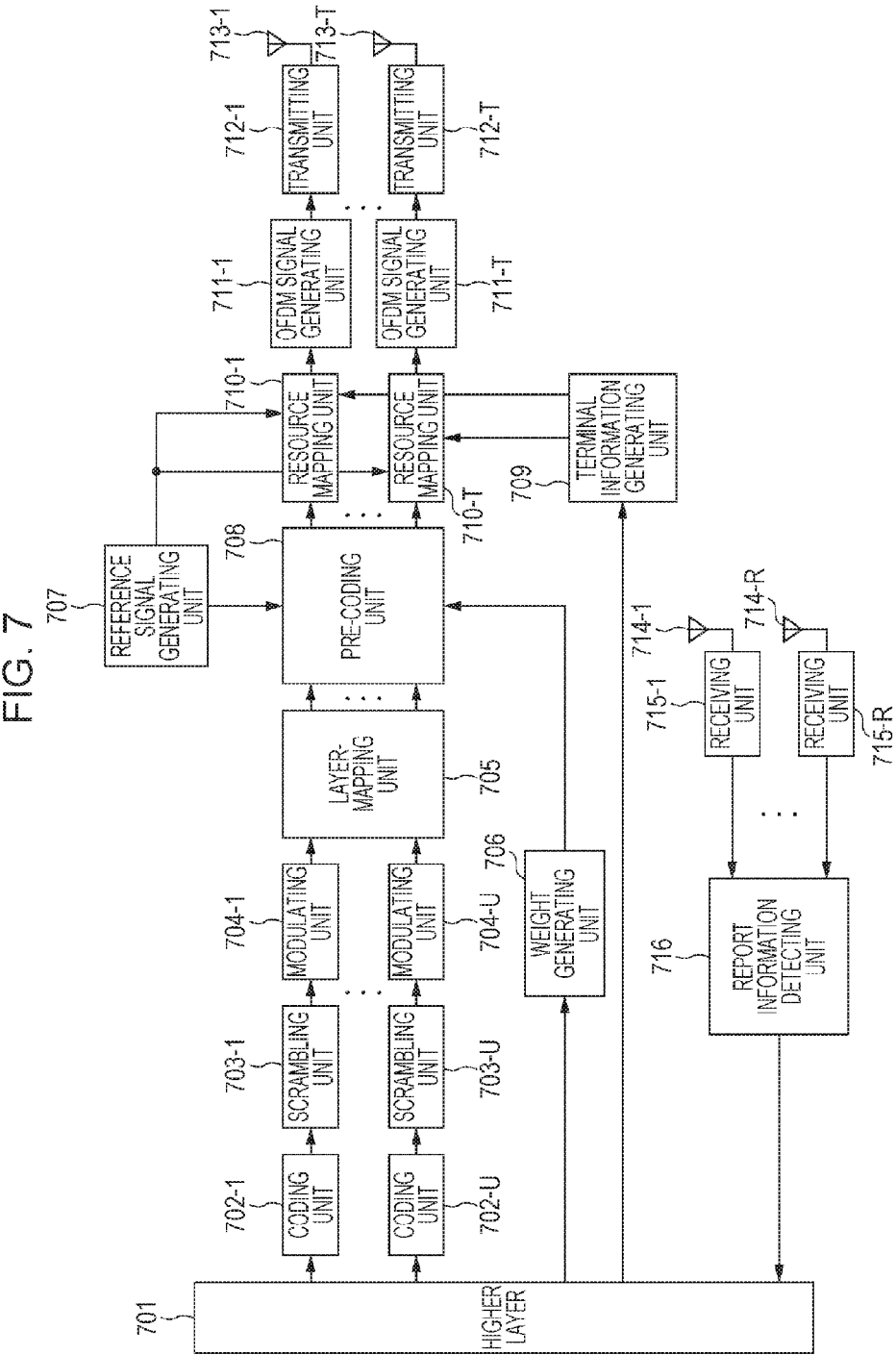
FIG. 7 is a block diagram diagrammatically illustrating a base station apparatus of the third embodiment.

FIG. 7 is a block diagram diagrammatically illustrating the base station apparatus 100-1 of the present embodiment. The base station apparatus 100-1 includes a higher layer 701, coding units 702-1 through 702-S, scrambling units 703-1 through 703-U, modulating units 704-1 through 704-U, a layer-mapping unit 705, a weight generating unit 706, a reference signal generating unit 707, a pre-coding unit 708, a terminal information generating unit 709, resource mapping units 710-1 through 710-T, OFDM signal generating units 711-1 through 711-T, transmitting units 712-1 through 712-T, transmit antennas 713-1 through 713-T, receive antennas 714-1 through 714-R, receiving units 715-1 through 715-R, and a report information detecting unit 716. If part or whole of the base station apparatus 100-2 is integrated into an integrated circuit as a chip, the base station apparatus 100-2 includes a chip control circuit.

The higher layer 701 is a layer higher than a physical layer, for example, the higher layer 701 may be an MAC layer, a data link layer, or a network layer. The higher layer 701 notifies other parameters for each element of the base station apparatus 100-2 to perform the function thereof.

The coding units 702-1 through 702-U perform an error-correction code information data input via the higher layer 701, thereby generating a coded bit (codeword). The coding units 702-1 through 702-U may perform rate matching on the coded bit sequence such that the coding rate of the error-correction coded data sequence matches a coding rate responsive to the data transmission rate. The coding units 702-1 through 702-U may have an interleave function to re-construct a data sequence that has been error-correction coded.

The scrambling units 703-1 through 703-U scramble the codewords input from the coding units 702-1 through 702-U in accordance with the respective cell IDs. The modulating units 704-1 through 704-U map the scrambled codewords to modulation symbols. The modulating units 704-1 through 704-U may have an interleave function to re-construct the modulation symbols. The layer-mapping unit 705 layer-maps the modulation symbols for spatial multiplexing.

The weight generating unit 706 generates the transmission and reception weights that suppress the interference using the channel information from a neighboring cell. The reference signal generating unit 707 generates the reference signal, and outputs to the pre-coding unit 708 the reference signal to be pre-coded, and to the resource mapping units 710-1 through 710-T the reference signal that needs no pre-coding.

The pre-coding unit 708 pre-codes the output of the layer-mapping unit 705 and the input reference signal using the transmission weight generated by the weight generating unit 706.

The terminal information generating unit 709 generates information concerning another terminal device for the terminal device 101 to detect and cancel the interference signal.

The resource mapping units 710-1 through 710-T map information indicating the output of the pre-coding unit 708, the reference signal, and terminal information to resources. If the terminal device 102 needs to be notified of the transmission and reception weights, information indicating the transmission and reception weights is mapped to the resources.

The OFDM signal generating units 711-1 through 711-T perform an IFFT operation on and insert cyclic prefixes into the output of the resource mapping units 710-1 through 710-T. The transmitting units 712-1 through 712-T perform a digital-to-analog conversion operation, a filtering operation, a frequency conversion, and other operations on the generated OFDM signals, and the resulting signals are transmitted through the transmit antennas 713-1 through 713-T.

The base station apparatus 100-2 also has a function of receiving signals. The receive antennas 714-1 through 714-R receive signals from the terminal device 101, and the receiving units 715-1 through 715-R perform a frequency conversion operation, a filtering operation, an analog-to-digital conversion operation, and other operation on the received signals. The report information detecting unit 716 acquires the channel matrix between the base station apparatus 100-2 and the terminal device 101 and information for scheduling, in accordance with the CSI fed back from the terminal device 101.

The general block configuration of the terminal device 101 is similar to the block configuration of FIG. 4 described with reference to the first embodiment and the discussion thereof is omitted herein. But the operation of the signal detection unit 306 is different in detail and is thus described together with the operation of the weight generating unit 706 of FIG. 7 in accordance with formulas.

In the present embodiment, the received signal of the terminal device 101 is expressed by formula (27) because the transmission weight is multiplied by the base station apparatus. Formula (27) represents the received signal in the resource element (k,t) as in formula (1), but (k,t) is omitted unless otherwise necessary.

[Math 19]

$$r = H_{11}V_1 s + H_{12}V_2 s_2 + n \qquad (27)$$
$$= H_{11}^v s + H_{12}^v s_2 + n$$

$V_1$ represents the transmission weight of the base station apparatus 100-2, and $V_2$ represents the transmission weight of the base station apparatus 100-1. $H_{11}$ represents the channel matrix between the base station apparatus 100-2 and the terminal device 101 in the present embodiment. $H_{11}$ includes a desired signal channel and an inter-user interference channel. Here, s represents a transmission signal from the base station apparatus 100-2 to each of the terminal devices 101 and 102. $H_{12}$ represents a channel matrix between the base station apparatus 100-1 and the terminal device 101. Also, $s_2$ represents a transmission signal from the base station apparatus 100-1 to the terminal device connected to the base station apparatus 100-1. The transmission weight and the reception weight may be different from subcarrier to subcarrier, or may be the same on multiple subcarriers, such as a resource block. An equivalent channel into which the channel matrix and the transmission weight are combined is expressed by formula (28), and an equivalent channel into which the channel matrix and the reception weight are combined is expressed by formula (29). $U_p$ represents the reception weight.

[Math 20]

$$H_{pq}V_q = H_{pq}^v \qquad (28)$$

$$H_{pq}U_p^H = H_{pq}^u \qquad (29)$$

The transmission weight of each base station apparatus is determined as an eigenvector of eigen values of the number of streams of a signal detected by a connected terminal device in accordance with formulas (30) and (31), whichever is larger. More specifically, the eigenvector of formula (30) is $V_1$, and the eigenvector of formula (31) is $V_2$.

[Math 21]

$$(\hat{H}_{11}{}^u)^H \hat{H}_{11}{}^u ((\hat{H}_{21}{}^u)^H \hat{H}_{21}{}^u + \sigma_n^2 I)^{-1} \qquad (30)$$

$$(\hat{H}_{22}{}^u)^H \hat{H}_{22}{}^u ((\hat{H}_{12}{}^u)^H \hat{H}_{12}{}^u + \sigma_n^2 I)^{-1} \qquad (31)$$

$V_1$ and $V_2$ are determined such that SLNR (Signal to Leakage and Noise power Ratio) is maximized. The present invention is not limited to this method. $V_1$ and $V_2$ may be determined according to ZF (Zero Forcing) criteria or MMSE (Minimum Mean Square Error) criteria. In formulas (30) and (31), the transmission weight is determined in view of the reception weight. Alternatively, the transmission weight may be determined without accounting for the reception weight. If the reception weight is not accounted for, the reception weight may be unit matrix.

The reception weight of each terminal device is determined as an eigenvector of eigen values of the number of streams of a signal detected by a connected terminal device in accordance with formulas (32) and (33), whichever is larger.

[Math 22]

$$\hat{H}_{11}{}^v(\hat{H}_{11}{}^v)^H(\hat{H}_{12}{}^v(\hat{H}_{12}{}^v)^H + \sigma_n^2 I)^{-1} \quad (32)$$

$$\hat{H}_{22}{}^v(\hat{H}_{22}{}^v)^H(\hat{H}_{21}{}^v(\hat{H}_{21}{}^v)^H + \sigma_n^2 I)^{-1} \quad (33)$$

The reception weight of the terminal device 101 is determined in accordance with formula (32). The reception weight of the terminal device (not illustrated) connected to the base station apparatus 100-1 is determined in accordance with formula (33).

The base station apparatus may determine a transmission weight accounting for the reception weight. Alternatively, the base station apparatus may determine a reception weight accounting for the transmission weight. The transmission weight and reception weight are determined repeatedly in an alternate fashion, interference suppression performance may be improved. The initial value of the transmission weight or reception weight may be configured to be any value. The transmission weight and reception weight that do not mutually account for each other may be used. The transmission weight and reception weight may be determined using the covariance matrix of a channel.

In accordance with the preset embodiment, all transmission weights and reception weights of each base station are determined. The present invention is not limited to this method. Alternatively, one base station apparatus determines all transmission weights and reception weights and then notifies each base station apparatus of a needed weight. The base station apparatus may notify the terminal device of the determined reception weight. Alternatively, the base station apparatus does not notify the terminal device of the weight, but the terminal device may determine the reception weight.

The transmission weight and reception weight are used to suppress the interference signal from the base station apparatus 100-2. The interference signal from the base station apparatus 100-1 may be canceled in a fashion similar to the first embodiment, or the maximum likelihood is detected in a fashion similar to the second embodiment.

In accordance with the third embodiment, the terminal device detects and cancels an interference stream within the same cell out of the interference streams, and suppresses the inter-cell stream using the transmission weight or the transmission and reception weights. Even if the terminal device is unable to detect all interference streams, the interference may be suppressed. Throughput is thus increased.

In accordance with the first through third embodiments, the interference signal from a single base station apparatus is detected and canceled. The present invention is not limited to this method. The present invention is applicable even if interference signals come in from multiple base station apparatuses.

In accordance with the first through third embodiments, the interference signal from a single base station apparatus is suppressed using the weight. The present is not limited to this method. The present invention is applicable even if interference signals from multiple base station apparatuses are to be suppressed.

In accordance with the first through third embodiments, two terminal devices are spatial-multiplexed within a single cell. The present invention is not limited to this configuration. Three or more terminal devices may be spatial-multiplexed. In such a case, interference from signals addressed to two or more terminal devices may be detected and canceled. The terminal device may not necessarily have to detect and cancel all interference streams within the cell. It is sufficient if some of the interference streams are detected and canceled.

A program running on the base station and the mobile station apparatus of the present invention is a program that controls a CPU (a program for causing a computer to function) in a manner such that the functions of the embodiments of the present invention are implemented. Information handled by these apparatuses may be temporarily stored on a RAM during process, and then stored on a variety of ROMs or HDD. The information may be read, corrected, or written by the CPU as necessary. Recording media storing the program may include a semiconductor memory (such as a ROM or a non-volatile memory card), optical recording medium (such as DVD, MO, MD, CD, or BD), and magnetic recording medium (such as a magnetic tape or a flexible disk). The functions of the embodiments are implemented by executing the loaded program. The functions of the invention may also be implemented in conjunction with an operating system or another application program in response to an instruction of the program.

To circulate the program in the market, the program may be supplied in a stored state on a portable recording medium, or is transferred to a server computer via a network such as the Internet. In such a case, a storage device in the server computer also falls within the scope of the present invention. Whole or part of the base station and the mobile station apparatus of the above-described embodiments may be implemented as LSI as a typical integrated circuit. Each function block in the base station and the mobile station apparatus may be individually integrated into a chip. Alternatively, all or some of the function blocks may be integrated into a chip. If function blocks are integrated into a circuit, a controller controlling the function blocks may be added.

The integrated form may not be limited to LSI. The integrated form may be a dedicated circuit, or a general-purpose processor. If a technique of circuit integration replacing the LSI appears with the advance of semiconductor technique, an integrated circuit resulting from the technique may also be used.

The present invention is not limited to the above-described embodiments. The terminal device of the present invention is not limited to the mobile station apparatus. The terminal device of the present invention may be applied to an apparatus installed indoors or outdoors, or non-portable electronics, such as AV apparatus, kitchen equipment, cleaner and washing machine, air-conditioner, office equipment, vending machine, or other life support devices.

The embodiments of the present invention have been described above with reference to the drawings. The specific configuration is not limited to these embodiments. Design not departing from the scope of the present invention may fall within the scope defined by the claims.

INDUSTRIAL APPLICABILITY

The present invention appropriately finds applications in a terminal device, and a reception method.

REFERENCE SIGNS LIST

100-1 and 100-2 Base station apparatuses
101 and 102 Terminal devices
201, 307, and 701 Higher layers 202-1 through 202-U and 702-1 through 702-U Coding units
203-1 through 203-U and 703-1 through 703-U Scrambling units
204-1 through 204-U and 704-1 through 704-U Modulating units
205 and 70 Layer-mapping units
206, 308, and 707 Reference signal generating units
207 and 708 Pre-coding units
208 and 709 Terminal information generating units
209-1 through 209-T, and 710-1 through 710-T Resource mapping units
210-1 through 210-T, and 711-1 through 711-T OFDM signal generating units
211-1 through 211-T, 310-1 through 310-T, and 712-1 through 712-T Transmitting units
212-1 through 212-T, 311-1 through 311-T, and 713-1 through 713-T Transmit antennas
213-1 through 213-R, 301-1 through 301-R, and 714-1 through 714-R Receive antennas
214-1 through 214-R, 302-1 through 302-R, and 715-1 through 715-R Receiving units
215 and 716 Report information detecting units
303-1 through 303-R CP removal units
304-1 through 304-R FFT units
305 Channel estimation unit
306 Signal detection unit
309 Uplink signal generating unit
401 and 406 Channel compensation units
402 Demodulating unit
403 Descrambling unit
404 Decoding unit
405 Interference cancellation unit
501 Pre-filtering unit
502 Maximum likelihood detecting unit
503-1 through 503-N Descrambling units
504-1 through 504-N Decoding units
706 Weight generating unit

The invention claimed is:

1. A terminal device in communication with a first base station apparatus, the terminal device comprising:
    a receiving unit configured to receive a control signal and a data signal, and
    a signal detection unit configured to demodulate the data signal using the control signal, wherein
    the control signal includes information indicating an antenna port number and a modulation an interference signal; and
    the signal detection unit cancels the interference signal within a cell, that is transmitted by the first base station apparatus using the control signal to suppress inter-cell interference transmitted by a second base ion apparatus other than the first base station apparatus using a reception weight.

2. A communication method for use in a terminal device in communication with a first base station apparatus, the method comprising:
    receiving a control signal and a data signal, and
    demodulating the data signal using the control signal, wherein the control signal includes information indicating an antenna port number and a modulation scheme for an interference signal; and
    canceling the interference signal within a cell, that is transmitted by the first base station apparatus using the control signal to suppressing inter-cell interference transmitted by a second base station apparatus other than the first base station apparatus using a reception weight.

* * * * *